H. J. S. THOMAS.
SPEED INDICATING AND RECORDING INSTRUMENT.
APPLICATION FILED MAR. 25, 1920.
1,377,293.
Patented May 10, 1921.
2 SHEETS—SHEET 1.
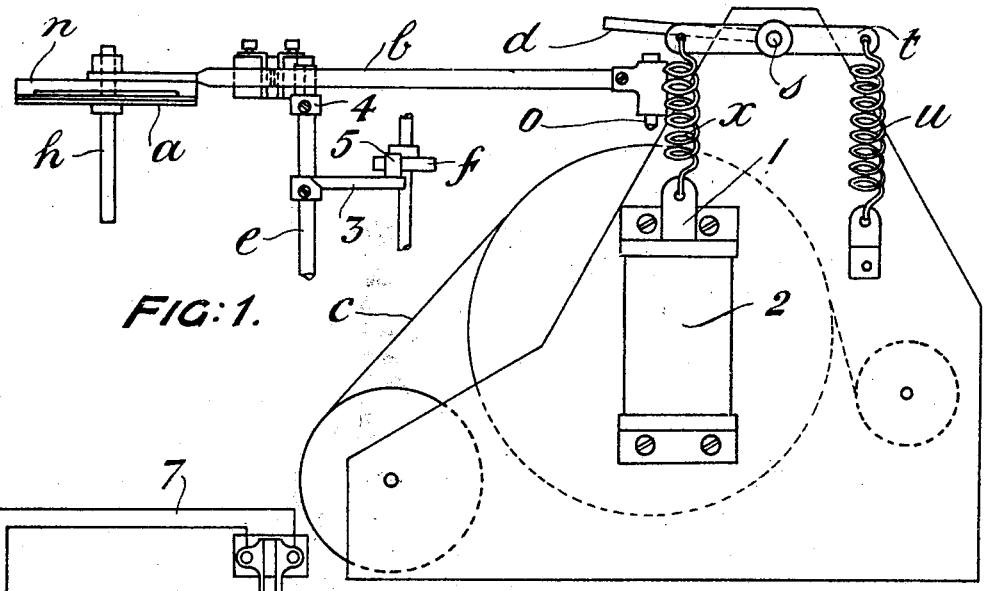
FIG: 1.
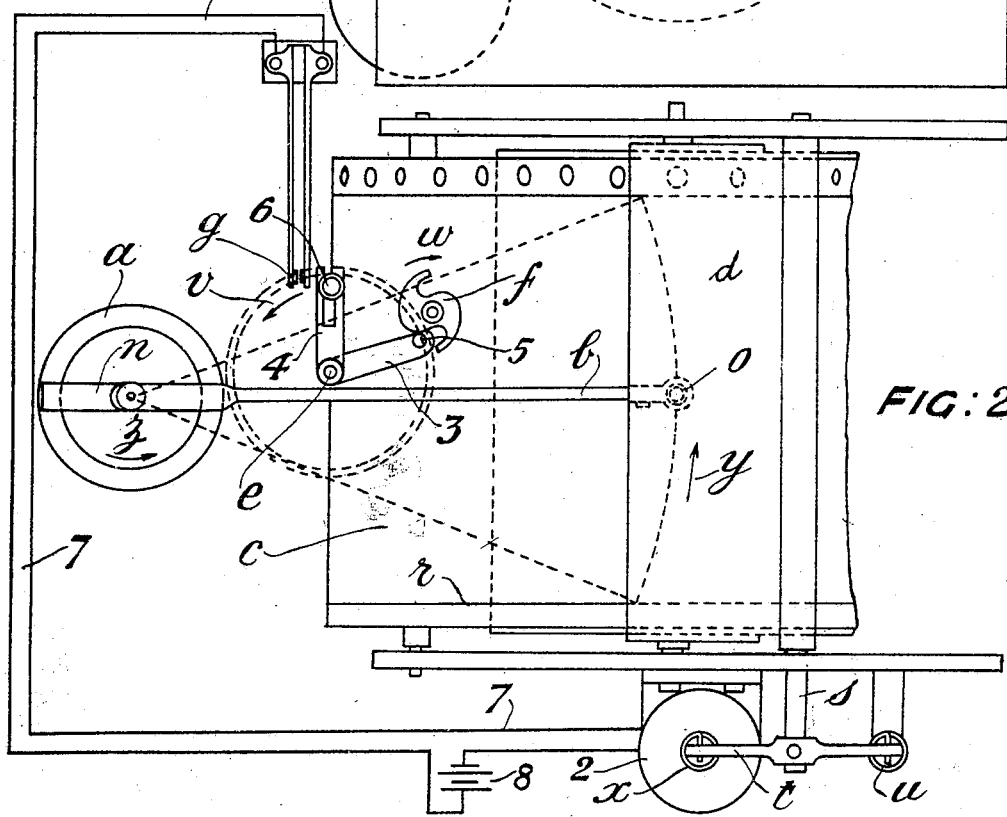
FIG: 2.

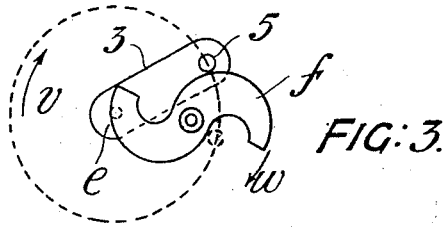
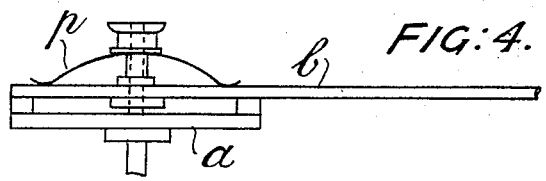
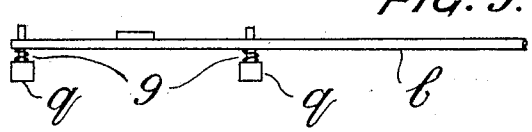
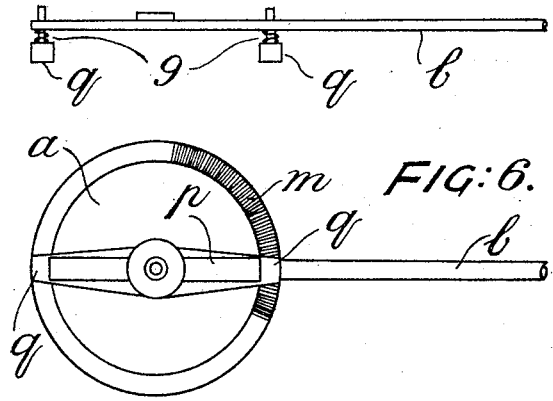
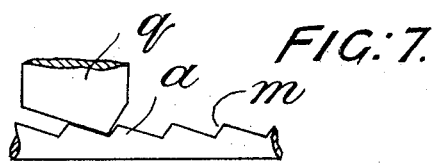

UNITED STATES PATENT OFFICE.

HUBERT JASPER SCARD THOMAS, OF HAVERTON HILL, ENGLAND.

SPEED INDICATING AND RECORDING INSTRUMENT.

1,377,293.      Specification of Letters Patent.      Patented May 10, 1921.

Application filed March 25, 1920. Serial No. 368,630.

*To all whom it may concern:*

Be it known that I, HUBERT JASPER SCARD THOMAS, a subject of the King of Great Britain and Ireland, residing at 1 Albert Terrace, Haverton Hill, county Durham, England, have invented certain new and useful Improvements in Speed Indicating and Recording Instruments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for indicating and recording the speed of rotation of a revolving body, *e. g.* a rotating shaft.

Apparatus of this type is already known in which a marker arm is brought into frictional contact with the revolving body whose speed of rotation is to be measured, and is by this means periodically swung across a moving chart on which it marks a record. The subject matter of the present invention is an improved apparatus of this type.

It has heretofore been proposed to employ a spring to return the marker arm to its initial position after each stroke or sweep, the spring being wound up or energized by power taken from the revolving shaft whose speed of rotation is to be measured. In my opinion, this practice is, in many cases, objectionable as it is undesirable to take more than the minimum of power from the revolving body. The chief object of the present invention is to provide independent power for doing the work of returning the marker arm to its initial position as well as for doing the work of marking the chart.

The present invention will be described in the following specification and more particularly defined in the annexed claim. The chief characteristic feature of the invention resides in the fact that the marker arm is returned to its initial position by power taken, not from the said revolving body, but from an independent source. A subsidiary feature of the present invention consists in the fact that the marker arm return mechanism is also employed to control the energizing of an electro-magnet which pulls the marker arm down on the chart to mark the latter. A further subsidiary feature of the present invention consists in the provision of an intermittently-rotating escapement which is driven from an independent source of power (*e. g.* a second hand-wound-up spring) and alternately holds and releases the marker arm.

In the accompanying drawings which illustrate this invention:—

Figure 1 is a side elevation of such parts of the mechanism of an instrument which embodies this invention as are necessary to the understanding of the invention.

Fig. 2 is a plan of Fig. 1.

Fig. 3 shows a modification of the escapement shown in Figs. 1 and 2.

Fig. 4 shows a modified form of frictional contact means between the marker arm and the revolving body.

Fig. 5 shows another modification of the same.

Fig. 6 shows a further modification of the same in which ratchet teeth are employed.

Fig. 7 is a detail of a pawl and the ratchet teeth of the construction shown in Fig. 6.

Like reference characters indicate like parts throughout the drawings.

Referring to Figs. 1 and 2, the invention is illustrated as used with a rotating disk *a* to produce a graphic record of the rate at which this disk rotates during successive equal periods of time. The direction of rotation of the disk is indicated by the arrow *z*.

An arm *b* is mounted coaxially with the spindle *h* of the rotating disk *a* so as to swing, as shown in Fig. 2, across a chart *c*. The arm *b* is engaged with the disk *a* by a bar *n* secured on the arm *b* and having frictional engagement with the disk *a* at the opposite ends of a diameter thereof. The frictional engagement is sufficient to insure that, when the arm *b* is free, it is carried around by the disk *a*, that is, it is swung across the chart in the direction indicated by the arrow *y*, but the arm can be swung back, that is moved in the opposite direction, without interfering appreciably with the motion of the disk. At its free end, the arm *b* carries any suitable form of marking device *o*.

The chart of course is arranged to travel and may be actuated in the usual way or any other suitable manner. The line *r* is the "datum line" on the chart; the initial position of the marker *o*, that is its position at the beginning of each sweep, is on this line. The marking device o is normally held clear of the chart c, but it is periodically pressed down on the chart to make a mark thereon by a plate d pivotally mounted at s in the frame of the machine. On the end of the pivot-pin s in an arm t whereof one end is tied by a spring u to a fixed point on the frame of the mechanism, and the other end is coupled by a spring x to the armature 1 of an electro-magnet 2 suitably positioned on the side-frame. When this magnet is energized, it pulls down the plate d and presses the marker o onto the chart c.

The mechanism for returning the arm b to its datum line at definite intervals of time, comprises a spindle e driven in any convenient manner as by a hand-wound-up spring or a falling weight, or an electric motor. The direction of rotation of the spindle e is indicated by the arrow v. This spindle carries two arms 3, 4. The arm 3 carries a pin 5 and constitutes a crank-arm which engages an escapement device f. This escapement f is so shaped that normally it engages the pin 5 and thereby holds the arm 3 from movement, but, as it rotates, it releases the pin 5 at predetermined intervals of time. In the arrangement shown in Fig. 2, the escapement f is rotated in the direction indicated by the arrow w, the rotation being produced by a separate source of power (e. g. a second hand-wound-up spring). The pin 5 is shown as held by the escapement f; it will be released when the escapement f has turned through somewhat less than 90°.

The second arm 4 carried by the spindle e has a pin 6 constituting a crank-arm mounted so as to be adjustable radially in a slot in the arm. When the spindle e rotates, the pin 6 is carried around and first engages a pair of contacts g to cause them to close an electric circuit indicated at 7 through a battery 8 and the electro-magnet 2. On the further rotation of the arm 4, the pin 6 engages the arm b which has been swung by the rotation of the disk a to some position away from the datum-line r and carries it back to the said datum-line. This backward movement of the arm b is possible because its engagement with the disk a is only frictional as stated above.

It will be appreciated that the pin 6 is made adjustable radially on the arm 4 in order that the arm b may be returned exactly to its datum-line r.

The operation of this mechanism is as follows:—

Assuming that the marker o is at the datum-line r, the arm b is swung across the chart by its engagement with the disk a at a speed proportional to that of the disk, until the pin 5 is released from the escapement f. The pin 6 then starts to move and first engages the electric contact g completing the circuit 7 and energizing the electromagnet 2. The plate d is thereby depressed and forces the marker o down into contact with the chart c to make a mark thereon. This mark shows the position which the arm b has reached in the definite interval of time in which it has been in motion. Further rotation of the spindle e causes the crank-pin 6 to engage the arm b and return it to its datum-line position. At this point it leaves the arm and continues its rotation until the crank-pin 5 again engages the escapement member f. This latter has moved into such a position that it retains the pin 5, and therefore the spindle e, against further movement during a predetermined period of time until the escapement has turned into such a position as to release the pin 5 again. When the pin 6 leaves the arm b in its datum-line position, the said arm immediately commences a new sweep over the chart c. This cycle of operations is continuously repeated, the period of the cycle being determined by the rate of rotation of the escapement device.

It will be understood that the movement of the arm b during these definite intervals depends upon the rate of movement of the disk a. When the disk is moving rapidly, the arm will be carried further in this definite period of time than it is when the disk is moving slowly. Further, should the movement of the disk a be irregular, the movement of the arm b is equal to the total movement of the disk a in a definite period of time, and an average value is thereby obtained.

If a design of mechanism is desired in which the spindle e and the escapement f both rotate in the same direction, these parts are arranged as shown in Fig. 3 where the axis of rotation of the escapement f is arranged inside the path of the pin 5. With this arrangement, the effort exerted by the pin 5 does not oppose the movement of the escapement f nor affect the accuracy of its rate of movement.

Fig. 4 illustrates a modified form of coupling connecting the arm b with the disk a. A light spring p is introduced to press the two members against each other with just sufficient pressure.

A further modification is shown in Fig. 5 in which the blocks q carried by the arm b to engage the disk a frictionally are provided each with a spring 9 to press it against the disk with just sufficient pressure.

Figs. 6 and 7 illustrate a further modification. The disk a is formed with ratchet teeth m around the circumference; and the blocks q carried by the arm b are formed at the ends as pawls which engage with these teeth. The teeth and pawls are so shaped as to insure the disk a driving the blocks q in one direction but permitting the pawl to slip over the teeth in the reverse direction. A spring p similar to that employed in Fig. 4 may be used to press the pawls against the ratchet teeth.

Similarly the escapement device f may be of any desired formation consisting of one, two, or more lobes on an escapement spindle. Similarly various other modifications may be made in the precise details of construction without departing from the scope of the present invention.

The chart produced by this device has a series of points plotted on it at positions corresponding to the lengths of the arcs swept out by the arm b; and these points will lie in a curve along the chart. When the member a is the disk of a watt-hour (electricity) meter, the chart will give an indication of the number of units metered in each of the successive equal time periods, and the curve will therefore give an indication of the rate of energy consumption over the whole period during which the apparatus is in use; and, in general, if the instrument is applied to any form of meter for measuring total consumption, a chart giving the varying rate of consumption can be obtained. If the instrument is applied to a mileage recorder or cyclometer device, the chart will give a record of the variations in velocity during the whole period during which it is in action.

Having thus described my invention, what I claim as new and desire to secure by Letters Patent is:—

In an instrument for indicating and recording the speed of rotation of a revolving body, the combination with a moving scale, a marker arm, and means whereby the rotation of the said revolving body swings the said marker arm periodically over the said moving scale, of mechanism for periodically returning the said marker arm to its initial position, means, independent of the said revolving body, for actuating the said mechanism, means, independent of the said revolving body and of the said means, for periodically holding the said mechanism stationary, and means for pressing the said marker arm against the said chart to make a mark thereon.

I hereby sign my name to this specification.

HUBERT JASPER SCARD THOMAS.